Aug. 14, 1945.  E. H. KOCHER  2,382,426
LUBRICATION
Filed July 22, 1940   2 Sheets-Sheet 1
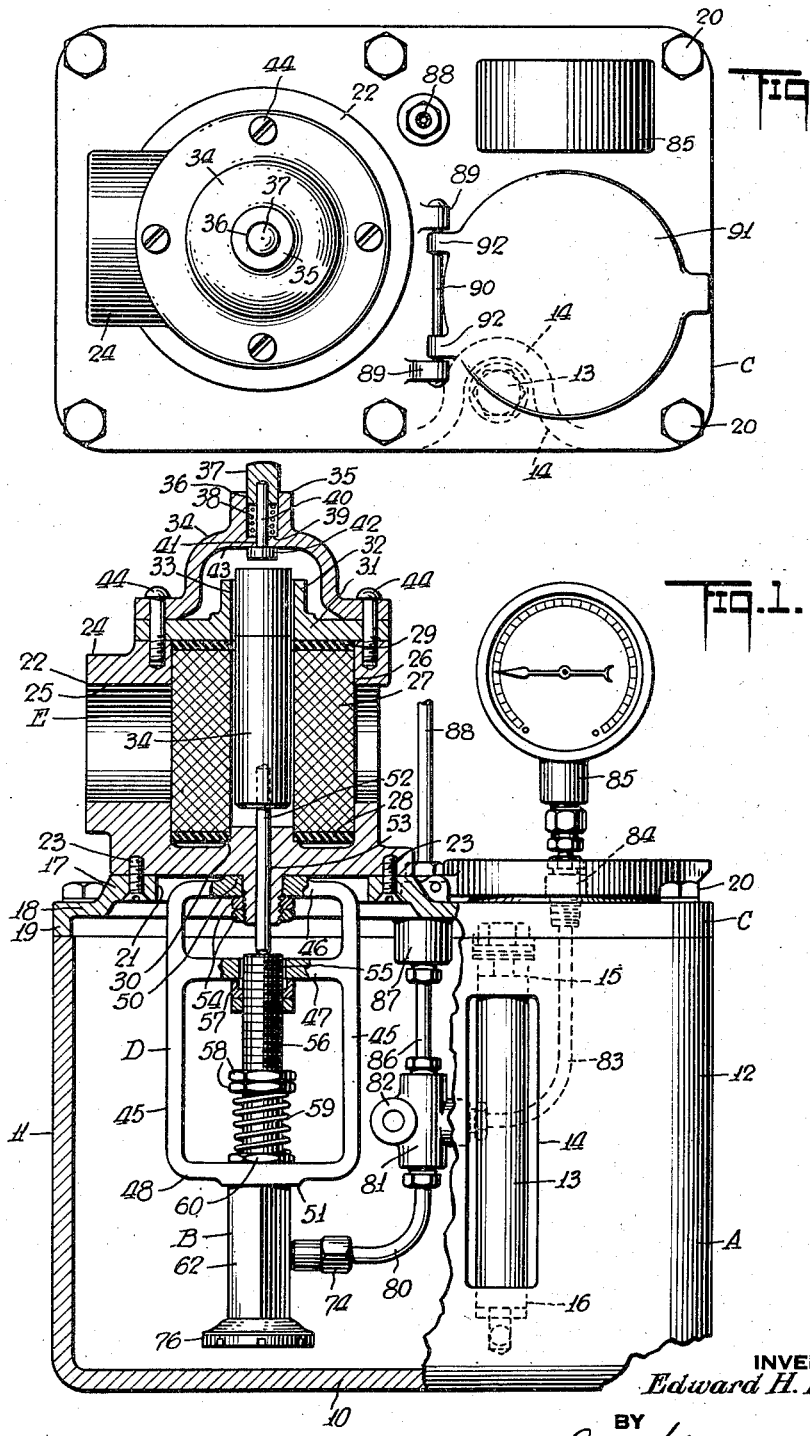
INVENTOR
Edward H. Kocher
BY
Dean Fairbank & Hinsch
ATTORNEYS Aug. 14, 1945.   E. H. KOCHER   2,382,426
LUBRICATION
Filed July 22, 1940   2 Sheets-Sheet 2
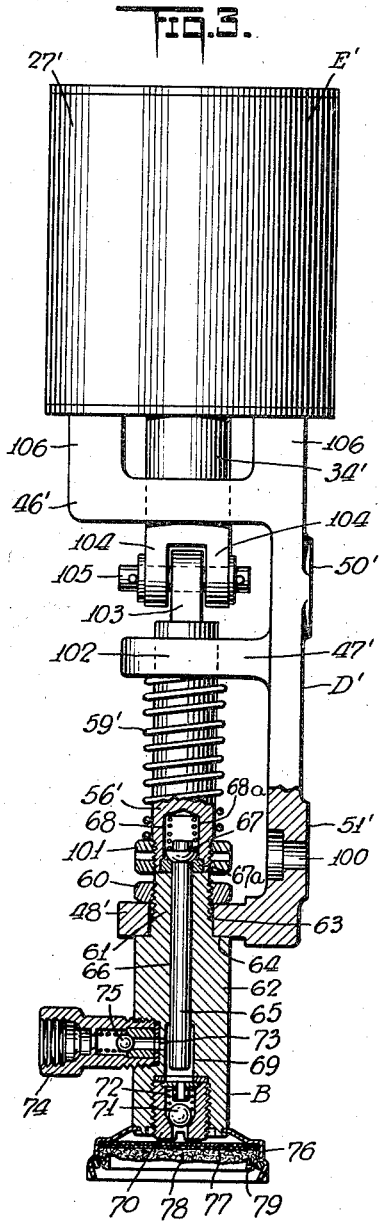
INVENTOR
*Edward H. Kocher*
BY
*Dean Fairbank & Hirsch*
ATTORNEYS Patented Aug. 14, 1945

2,382,426

UNITED STATES PATENT OFFICE 2,382,426

LUBRICATION

Edward H. Kocher, Boonton, N. J., assignor to Auto Research Corporation, a corporation of Delaware Application July 22, 1940, Serial No. 346,726

4 Claims. (Cl. 184—26)

The present invention relates to a centralized lubricating installation and particularly relates to a central pressure source or pump to be utilized with such a centralized lubricating installation.

Although the present invention will be particularly illustrated in its application to pumps or central pressure sources for centralized lubricating installations which have a single inlet and a plurality of outlets at relatively remote points to bearings requiring relatively minute yet accurately proportioned quantities of lubricant which is accomplished by the use of high restriction flow metering outlet fitting devices having a much higher restricting effect than the tubing, the conduits and the bearings, it is to be understood that the invention has a broader application to lubricating installations in general.

It is among the objects of the present invention to provide an improved centralized lubricating pressure source or pump, as the case may be, which may be conveniently used in connection with the lubrication of various types of mechanisms and machinery, and positioned in and about such mechanisms and machinery with minimum space consumption, and which at the same time will be readily accessible and not subject to derangement and undue wear and be in such position that it may be readily connected with a suitable power source.

Still further objects and advantages will appear from the more detailed description set forth below, it being understood, however, that this more detailed description is given by way of illustration, since various changes therein may be made by those skilled in the art without departing from the scope and spirit of the invention.

The essential feature of the present invention consists in providing a reciprocating piston or plunger pump with a bracket and in providing upon said bracket or in combination with such bracket an electromagnetic or solenoid motor which is energized periodically in proportion to the number of reciprocations or rotations of a part of the machine to be lubricated. This in turn will cause an armature to reciprocate, which armature is provided with a connection to the piston or plunger to eject a measured charge into the distributing system upon each reciprocation.

If desired, this solenoid may be energized by contact of a moving element upon the mechanism with a fixed contact point which will establish an energizing circuit, and if desired, a toggle mechanism may be actuated to establish and open a switch on said circuit.

In the drawings which show several of the various possible embodiments according to the present invention, but to which the present invention is by no means restricted, since the drawings are by way of illustration and not by way of limitation, Fig. 1 is a side sectional view of one type of pump according to the present invention, showing the actuator, the reservoir and the pump construction;

Fig. 2 is a top plan view of the pump structure of Fig. 1; and

Fig. 3 is a transverse side sectional view of an alternative construction of pump showing the pump construction in section.

Referring to Figs. 1 and 2, the reservoir A receives a pump B which is supported from the cover C by the bracket structure D. Positioned on the cover C is the solenoid or electric-magnetic actuating mechanism E.

The reservoir A as shown has a bottom 10 and side walls 11 and 12, which may be formed of a metal casting or which may constitute part of the structure of the machine being lubricated.

Since the walls are opaque in the construction shown in Fig. 1, a sight glass 13 is provided in the recess 14 having suitable lubricant tight connections as indicated at 15 and 16 to the upper and lower parts of the reservoir.

This connection of the sight glass 13 into the side wall 12 of the reservoir may be, for example, of the same type as shown and described in connection with Patent No. 2,145,245, issued January 31, 1939.

Less preferably, the reservoir A may be made of glass in which case the sight glass 13 is not needed. The cover C is provided with an elevated portion 17, a relatively depressed peripheral portion 18 and a depending flange 19. The bolts 20 are placed at intervals upon the periphery of the cover C to hold said cover firmly down in position upon the side walls 11 and 12 of the reservoir A.

The elevated portion 17 of the cover C is provided with an opening 21, which is covered by the structure 22. The structure 22 is bolted or screwed into position by the screws 23. The structure 22 is cylindrical except for the projecting portion 24, which has the passage 25.

The structure 22 has a central recess 26 which receives the annular coil or solenoid 27. The insulating contacts or washers 28 and 29 space the coil 27 from the stop shoulder 30 in the bottom of the recess 26, and from the cover 31 above the recess 26.

The cover 31 is provided with an upstanding element 32 having the central bore 33 serving as a bearing for the armature member 34.

Above the cover 31 is the domed structure 34a, which has a boss 35 recessed at 36 to receive the hand operating button 37. The hand operating button 37 is designed to reciprocate in the recess 36, and it is pressed to upward position by the coil spring 38 which reacts at its upper end against the bottom of the button 37 and at its lower end against the bottom 39 of the recess 36.

The button 37 is provided with a pin 40 which extends through the opening 41 at the bottom of the recess 36. The lower part of the pin 40 is provided with a head 42 which normally is pressed up against the under face 43 of the pump 34 by the spring 38.

The dome 34 and the cover 31 are held in position on the structure 22 by the bolts 44. To the bottom of the structure 24 is attached the bracket D, which has the side arms 45 and the cross arms 46, 47 and 48.

The bracket D is provided with upper and lower bosses 50 and 51, respectively, the upper boss abutting the bottom of the structure 22 and the lower boss carrying the pump structure B. The armature 34 carries the rod 52 which passes through bore 53 in the bottom of the structure 22 and which also passes through the lock nuts 54 holding the structure D to the structure 22.

The lower end of the rod 52 contacts the upper end 55 of the element 56, which is provided with the adjusting nuts 57 and 58 to adjust and limit its stroke. Below the adjusting nuts 58 is held the coil spring 59 which also abuts the nut 60 threaded onto the extension of the pump body 62.

The pump structure is best shown in the lower part of Fig. 3, and as shown upon this figure, the nut 60 is threaded onto the projection 61 of the pump body 62, which passes up through the opening 63 of the bracket portion 48'.

The shoulder 64 is drawn up against the lower face of the bracket 48' by the nut 60. The piston 65 consists of an elongated unpacked polished metal rod which fits in the cylinder 66 bored in the central portion of the body 62 and at its upper end it is mushroomed as indicated at 67.

The mushroomed portion 67 is fitted into the recess 68 in the lower part of the stud shaft 56', which is encircled by the coil spring 59'. The mushroom 67 is held in position by the ring 67a and is pressed against said ring 67a by the spring 68a. The lower end of the piston 65 projects into the chamber 69 of slightly enlarged diameter as compared to the bore 66.

The bore 69 in the chamber is closed at its lower end by the insert 70 having the inlet ball check 71 which is pressed downwardly by the spring 72. The bore 73 in the side of the chamber is closed by the check valve unit 74 having the ball check 75 therein. The lower portion of the pump body 62 carries the filter unit 76 which has filter screen 77 and a filter pad 78 held in position by the snap ring 79.

Returning to Fig. 1, the outlet valve unit 74 connects with the tubing 80 which, in turn, connects to the junction 81 bolted at 82 to the side wall of the reservoir A.

From the junction 81, there is a connection 83 extending through the cover 84 to the pressure indicator 85.

The other connection 86 extends to the boss 87 in the cover C, which in turn connects to the outlet tube 88 which may feed a lubricating installation of the high restriction metering type such as for example, shown in Patents 1,632,771 or 1,632,772.

The top of the cover of the reservoir as best shown in Fig. 2, is provided with the ears 89 which receive the pivot rod 90 for the cap or cover 91. Said cap or cover 91 has the rearwardly projecting lugs 92 which are received on the rod 90.

In operation, the spring 59 reacting against the nuts 60 and 58 will tend to press the connecting rod 56 upwardly until the adjustable nuts 57 contact the cross arm 47. Energization of the solenoid E will press the armature 34 downwardly, pressing down the connecting rod 56, causing the piston to make a discharge stroke. When the solenoid E is deenergized, the connecting rod 56 will be elevated by the spring 59 with the piston taking the full stroke. The button 37 may be utilized to cause the piston to take short strokes when it is not operated by the solenoid, to test the system or to fill the lines with lubricant.

In the preferred construction, the piston 65 may have a reciprocatory speed of about 2 to 10 strokes per minute, with a stroke varying from ⅛ to ½ inch, depending upon the mechanism to be lubricated.

It is desirable that the discharge of the pump B into the system, including the tubing 88, be such that such tubing 88 will have sufficient resilient capacity to receive the entire discharge of the pump B and will maintain a substantially continuous discharge through its highly restricted flow metering outlets to the bearings.

In the construction shown in Fig. 3 (correspondingly functioning parts to those shown in Figs. 1 and 2 being indicated by the same numerals and letters primed), the solenoid E' is provided with an armature 34'. The bracket D' is provided with the bosses 50' and 51' having bolt holes 100, which enable the pump to be mounted within a reservoir construction. The spring 59' will press against the nut 101, threaded on to the lower end of the connecting rod 56'.

The upper end of the spring 59' will press against the intermediate leg 47' of the bracket D'. The upper end of the rod 56' will bear as indicated at 102 in an opening in the intermediate leg 47, and at its top portion it is provided with the projecting lug 103.

The lug 103 fits between the clevis jaws 104 at the lower end of the armature 34'. The pivot pin 105 extends from the jaws 104 and the clevis 103 and forms a pivotal connection, which permits lateral displacement between the armature 34' and the connecting rod 56'.

The upper leg 46' of the bracket D', is provided with the upstanding elements 106, upon which the solenoid E' is mounted. In the construction shown in Fig. 3, the solenoid E', when energized, will draw up the armature 34', compressing the spring 59' and charging the cylinder 69.

When the solenoid E' is de-energized, the spring 59 will return the piston 65, causing a discharge to take place into the tubing system to the bearings.

The solenoid structures E may be widely varied and may either be of the push or pull type operating at from 110 to 150 volts D. C. or A. C. They may have a maximum stroke ranging from ½ to 3" and they may vary in dimension from 1 to 5" in heighth and from 1 to 5" in diameter or width.

They generally are formed of a copper alloy coil wire and have a laminated iron frame and they also have synthetic resin laminated spools and guides. If desired, resistors may be placed in the solenoid circuits, as may also shunt coils.

What is claimed is:

1. Lubricating equipment comprising a bracket having an upper arm, a solenoid attached to the latter and having an armature core, a lower arm, a pump cylinder mounted on the latter extending therebelow and aligned with said armature core, a small bore unpacked plunger in said pump cylinder, a connecting rod having a resilient connection with respect to said pump plunger and rising therefrom said bracket having an intermediate arm through which said connecting rod extends, a spring urging said plunger to one extremity of its stroke, and means for effecting a thrust connection between said connecting rod and said solenoid core.

2. The combination recited in claim 1 in which the spring is connected to urge the pump plunger to charging position, and in which the armature core has an axial extension transmitting direct thrust to the connecting rod for effective discharge.

3. The combination recited in claim 1 in which the spring urges the pump plunger to discharge position, and a cross pin connects the upper end of the connecting rod to the lower end of the armature core.

4. The combination recited in claim 1 in which the solenoid is encased and has a cover with a manual operating member therethrough to permit actuation of the pump by manual impulse.

EDWARD H. KOCHER.